Patented Nov. 24, 1953

2,660,572

UNITED STATES PATENT OFFICE 2,660,572

RESINIFICATION OF AROMATIC HYDROCARBONS

Charles F. Feasley, Woodbury, N. J., assignor to Socony-Vacuum Oil Company, Incorporated, a corporation of New York No Drawing. Application February 11, 1950, Serial No. 143,839

1 Claim. (Cl. 260—67)

1

The present invention relates to the resinification of aromatic hydrocarbons and, more particularly, to a novel condensation catalyst and to the products produced by the condensation of aromatic hydrocarbons in the presence of said novel catalyst.

The condensation of aromatic hydrocarbons with various carbonyl compounds, especially aldehydes, in the presence of various catalysts is well known. In the prior art there are many descriptions of methods for carrying out the condensation of aromatic hydrocarbons with carbonyl compounds employing sulfuric acid, metal chlorides, such as ferric chloride, aluminum chloride, and zinc chloride, and acetic acid solutions of such metal chlorides. More recently it has been shown that the hydrogen halides, and particularly hydrogen fluoride, may be used to accelerate this condensation. In other words, the catalysts of the prior art are either acids or acid salts. It has now been discovered that this reaction can be accelerated by novel catalysts which do not appear to be of the same class as the catalysts described in the prior art. In addition, the novel products produced by condensing aromatic hydrocarbons and carbonyl compounds in the presence of the novel catalyst are very light colored compared to the products of the prior art processes. Moreover, the novel catalyst can be recovered and regenerated.

The structure of these condensation products is discussed and given in the A. C. S. monograph No. 98, entitled "Formaldehyde" by Walker, at page 235. This authority states that when sulfuric acid is employed as a catalyst for the formaldehyde-hydrocarbon reaction, these methylene-linked compounds or their sulfonates are apparently the only isolable products. The reaction indicated below is representative:

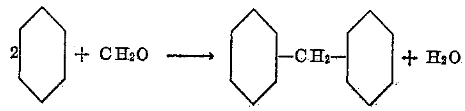

Thus, the products of the present condensation of aromatic petroleum stocks with formaldehyde in the presence of the novel catalyst are polymeric materials having as a major constituent a linear polymer of a unit [R—$CH_2$—R], in which R is a mono-valent radical of an aromatic hydrocarbon selected from the group consisting of alkylbenzenes, boiling above about 300° F., naphthalene, methylnaphthalene and dimethylnaphthalene. Of course, those skilled in the art will understand that since the aromatic petroleum

2 stock usually contains a mixture of aromatic hydrocarbons, the mono-valent radicals of the unit are just as likely to be different as to be the same.

It is an object of the present invention to provide a means for producing resinous condensation products by reacting aromatic hydrocarbons and carbonyl compounds in the presence of a recoverable, regeneratable catalyst. It is another object of the present invention to provide novel catalysts for the condensation of aromatic hydrocarbons with carbonyl compounds. It is a further object of the present invention to provide novel resinous condensation products and viscous oils by reacting aromatic hydrocarbons and carbonyl compounds in the presence of a recoverable, regeneratable condensation agent. Other objects and advantages will become apparent from the following description.

In general, the novel process involves heating an aromatic hydrocarbon or a mixture of hydrocarbons containing a substantial amount of aromatic hydrocarbons with a carbonyl compound in the presence of the novel catalyst under autogenous pressure at elevated temperatures of about 220° F. to about 420° F. until the reaction has become substantially completed. Suitable catalysts include the non-swelling, crystalline rather than amorphous, bentonite clays of the Montmorillonite type which have been activated by an acid treatment to give a composition approaching $Al_2Si_4O_{10}(OH)_2 \cdot nH_2O$. These clays may be natural or synthetic. In addition to the activated Montmorillonite type clays, fresh burnt Attapulgus clay, silica gel, and alumina-silica gel catalysts containing about 7 per cent to about 15 per cent alumina have also given satisfactory results. In other words, the novel catalyst is a solid adsorbent inorganic contact material, preferably in finely-divided or powdered form.

The carbonyl compounds employed are those described in the prior art. It is preferred, however, to use formaldehyde, and particularly trioxymethylene $(CH_2O)x$ or trioxane $(CH_2O)_3$.

In addition to resinous products, intermediate liquids are also obtained which have many uses.

Illustrative but in no way limiting are the following examples of preferred embodiments of the present invention. In these tests a non-swelling bentonite clay of the Montmorillonite type which had been activated by an acid treatment to give a composition approaching $$Al_2Si_4O_{10}(OH)_2 \cdot nH_2O$$

was used. This product is available in the activated state under the trade name "Super Filtrol." The acid activation treatment is well known to those skilled in the art and is described more or less in detail by B. A. Stagner in "The Science of Petroleum" volume III, page 1699 (Oxford Press) (1938). For the activation of small quantities of clay a similar treatment may be used. Thus, one kilogram of bentonite is boiled with 2,000 cubic centimeters of 17 per cent sulfuric acid for three hours. The mixture is filtered and the clay washed with distilled water until the filtrate is substantially free from acid (0.2 to 0.5 per cent acid). The clay is then dried to a moisture content of about 15 per cent and ground to pass a 200-mesh screen. When the acid treated clay is washed with "hard" water after the acid is neutralized, the clay is injured by absorbing basic ions from the water.

When only part of the total extractable material is leached from the clay by the acid, the maximum activity is developed. The optimum concentration of the acid is about 15 per cent to about 20 per cent. Sulfuric and hydrochloric acids are the most economical to use although sulfuric acid is somewhat slower than hydrochloric.

Illustrative of suitable materials for treatment in accordance with the principles of the present invention are the aromatic petroleum stocks and particularly those aromatic petroleum stocks known to the art as "Sovasols."

*Example 1*

Another aromatic petroleum stock which has been treated to produce similar viscous polymeric oils is one having the following characteristics:

| | |
|---|---|
| I. B. P. | 360° F. |
| 50% point | 475° F. |
| End point | 560° F. |
| Gravity °API | 17.1. |
| Flash point | 135° F. (min.). |
| Aniline point | 79° F. |
| Kinematic viscosity @ 100° F. | 1.93 centistokes. |

Forty pounds of the foregoing aromatic petroleum stock and 7.5 pounds of an acid activated clay of the Montmorillonite type were charged to a reactor provided with a stirrer and other conventional auxiliary equipment. The charge was heated, while being stirred, to a temperature of 250° F. Five pounds of paraformaldehyde were added portion-wise during about 30 minutes whilst the temperature was maintained at about 250° F. and for an additional 15 minutes. The reaction mixture was withdrawn from the reactor and stratified. The liquid portion of the reaction mixture was decanted and treated with 10 weight per cent of acid activated clay of the Montmorillonite type at 180° F. and the clay separated from the liquid reaction product. The so-treated liquid reaction product was distilled to a pot temperature of 410° F. at a pressure of 3 millimeters of mercury whereby a viscous polymeric oil was obtained as a pot residue.

This pot residue (polymeric oil) had the following characteristics:

| | |
|---|---|
| Viscosity at 210° F. kinematic centistokes | 836.1. |
| Softening point (ring and ball) °F. | 132. |
| Color (melted material) | Light 7. |
| Power factor: | |
| At 60° C. | 0.07% loss. |
| At 100° C. | 0.40% loss. |

*Example 2*

Numerous aromatic petroleum stocks were investigated in this study. These stocks had properties and compositions ranging over broad limits.

| | | |
|---|---|---|
| I. B. P. | °F. | 332–510 |
| 10% | °F. | 338–516 |
| 50% | °F. | 343–518 |
| 90% | °F. | 351–518 |
| EP | °F. | 367–520 |
| Gravity—°API | | 10.8–34.4 |
| Sp. gravity 60/60° F. | | 0.9944–0.8529 |
| Sp. gravity 20/4° C. | | 0.9906–0.8493 |
| Refractive index | | 1.48111–1.59614 |
| Benzene derivatives, per cent | | 3–90 |
| Naphthalene derivatives,[1] per cent | | 0–97 |
| Non-aromatic hydrocarbons, per cent | | 0–48 |

[1] Naphthalene, methyl-naphthalene, dimethylnaphthalene.

Illustrative of this class of material is one having the following distribution:

| | Per cent |
|---|---|
| Benzene derivatives | 43.7 |
| Naphthalene derivatives | 42.7 |
| Non-aromatic hydrocarbons | 13.6 |

The naphthalene derivatives are distributed in the manner indicated by the following:

| | Per cent |
|---|---|
| Naphthalene [1] | 4.2 |
| Methyl naphthalene | 27.8 |
| Dimethyl naphthalene | 68.0 |

[1] Per cent of total naphthalene derivatives.

About 50 pounds of the aforesaid aromatic petroleum stock, about 9 pounds of trioxymethylene and about 25 pounds of acid activated clay of the Montmorillonite type were mixed and held at about 280° F. and about 100–150 p. s. i. g. for about 1.5 hours. The reaction mixture was cooled to about 100° F. and filtered to remove the clay.

The clay filter cake was washed with an aromatic petroleum stock (Sovasol 75). This solvent and other low boiling materials were removed by distillation under reduced pressure from the total filtrates leaving a residue product (polymeric oil product A) equivalent to about 22.4% by weight of the original petroleum hydrocarbon charge. Polymeric oil product A was subjected to further distillation under reduced pressure. Polymeric oil product B was obtained as a viscous oil distillate by distilling 25 weight per cent of polymeric oil product A. Polymeric oil product C was obtained as a viscous oil distillate by distilling 35 per cent polymeric oil A.

The properties of these polymeric oils are tabulated in the following table.

| Polymeric oil | A | B | C |
|---|---|---|---|
| Gravity, ° API | 0.4 | 3.8 | 3.2 |
| Specific gravity, 60/60° F. | 1.0728 | 1.0458 | 1.0504 |
| Flash (open cup), ° F. | 370 | 315 | 325 |
| Fire, ° F. | 425 | 360 | 380 |
| Mixed aniline point, ° F. | 66.9 | 49.6 | 65.5 |
| Drop melting point, ° F. | 130.4 | <100 | 99.4 |
| Viscosity at 210° F.: | | | |
| Kinematic, Cs. | -------- | 19.3 | 37.3 |
| Saybolt, sec. | 146 | 95.2 | 175 |

*Example 3*

About 148 pounds of the aromatic petroleum stock used in the previous example, about 38.1 pounds of trioxymethylene and about 37.0 pounds of acid activated clay of the Montmorillonite type were heated for about 5.5 hours at 290°–295° F. and 95–110 p. s. i. g. The reaction mixture was filtered to remove clay and unreacted trioxymethylene. The clay was washed with an aromatic petroleum stock (Sovasol 73) and the washings combined with the original filtrate. The combined filtrate and washings were steam distilled to remove the Sovasol 73 and unreacted charge stock to obtain the desired polymeric oil as a still residue.

Those skilled in the art will understand that one of the distinguishing characteristics of the polymeric oils described herein is the exceptional power factor of the total reaction product polymeric oils. That is to say, those polymeric oils obtained by separating the reaction mixture from the catalyst and topping the reaction mixture at a temperature above the 90 per cent point of the petroleum stock to remove unreacted petroleum stock and to leave a polymeric oil as a still residue. The polymeric oils obtained in this manner have power factors of the order of about 0.07 per cent to about 0.2 per cent loss at 60° C. and about 0.4 per cent to about 0.6 per cent loss at 100° C.

In the foregoing description of the present invention the term aromatic petroleum stock has been used. As those skilled in the art know, aromatic petroleum stocks are mixtures of aromatic and non-aromatic hydrocarbons which, for the purposes of this invention are generally, those that contain a relatively high percentage of aromatic hydrocarbon constituents. Thus, those aromatic petroleum stocks sold commercially under the trademark "Sovasol," and particularly those known to the solvent industry as "Sovasol" #75, are illustrative of these aromatic petroleum stocks and are preferred charge stocks for the process.

"Sovasol" #75 is a generic term connoting aromatic petroleum stocks derived from Houdry cracking operations. These stocks have boiling point ranges varying between 150° C. and 210° C. and ordinarily contain between 50 per cent and 75 per cent aromatic hydrocarbons and the balance non-aromatic hydrocarbons, depending upon the source of the Houdry cracking stock and the severity of the cracking procedure in the Houdry units. The aromatic hydrocarbons that occur in "Sovasol" #75 stocks are believed to be, primarily, polyalkyl benzenes ranging from trimethyl benzene to tetramethyl benzene and including methylethyl benzenes and the propyl benzenes. There are three trimethyl benzenes, mesitylene or 1,3,5-trimethyl benzene; pseudocumene or 1,2,4-trimethyl benzene; hemimellitene or 1,2,3-trimethyl benzene. Likewise, there are three tetramethyl benzenes, durene or 1,2,4,5-tetramethyl benzene; isodurene or 1,2,3,5-tetramethyl benzene; and prehnitene or 1,2,3,4-tetramethyl benzene. The trimethyl benzenes constitute the predominant portion of the polyalkyl benzenes present in "Sovasol" #75 stocks. For example, if a "Sovasol" #75 stock containing 55 per cent aromatic hydrocarbons is subjected to distillation, the fraction boiling between 150° C. and 182° C. will contain 60 per cent (82 per cent of the aromatic hydrocarbons in original "Sovasol" #75) and will constitute 75 per cent of the original "Sovasol" #75 stock. This temperature range (150° C. to 182° C.), includes the boiling points of the trimethyl benzenes but does not include the boiling points of the tetramethyl benzenes.

Typical of stocks suitable for treatment by the present method are recycle stocks from cracking operations, cracked residue or distillates therefrom, solvent tars, reforming tars and distillates of such tars, and highly aromatic gas oils. Straight run stocks having an appreciable aromatic hydrocarbon content, of the order of 15 per cent to 25 per cent, are also amenable to treatment in accordance with the process of this invention. However, these latter are not considered the preferred charge stocks. It is preferred to use charging stocks containing upwards of 50 per cent aromatic hydrocarbons and these are to be considered the preferred charge stocks.

The properties of the resinous reaction products have extremely wide limits. Many times the desired product is an extremely viscous liquid obtained by simply topping the clay-free resin solution to remove unreacted hydrocarbon stock and low boiling reaction products. When topped at a slightly higher temperature, the residue from the same reaction product may be a tacky solid or when topped at even higher temperatures, under reduced pressure, the condensate will be a viscous liquid and the residue a non-tacky solid. In general, the melting points of the solid resins of this type will vary over a wide range with the materials topped at the higher temperatures having the higher melting points. In general, increasing the melting point of solid resins beyond certain limits may lead to extremely brittle resins. It is possible, therefore, to prepare resins of the proper viscosity, flash point, fire point and melting point for many uses. In the illustrative examples, the unreacted hydrocarbon stock was separated from the resins by either vacuum or steam distillation, or both. However, other methods of separation such as extraction, the addition of diluents such as petroleum ether, solvent naphtha and the like, with or without chilling, adsorption on clays followed by desorption and the like, may be used.

Although the foregoing illustrative examples have illustrated only the use of solid forms of materials capable of evolving formaldehyde, it is to be understood that formalin (37 per cent aqueous formaldehyde solution) and other carbonyl compounds such as acetone, may be used. Furthermore, it is to be understood that the phrase "clay of the Montmorillonite type" is used in the appended claims as a generic term for all of the novel condensation catalysts disclosed herein.

It is to be noted that the viscous fluids produced by the present process can be used as plasticizers, softeners for synthetic rubber, liquids for quartz testing and as hydraulic fluids and the like. Furthermore, those products of the present invention having the nature of viscous fluids and having a specific gravity between about 0.990 and 1.03 may be used as culicides.

The present application is a continuation-in-part of my copending application for United States Letters Patent Serial Number 627,763, filed November 9, 1945, now U. S. Patent No. 2,501,600.

I claim:

A polymeric material having a low power factor produced by a method which comprises heating an aromatic petroleum stock boiling within the range of between about 360° F. and about 560° F. with formaldehyde and an acid activated clay of the Montmorillonite type as the sole essential condensing agent, in a weight proportion of about 40 parts:about 5 parts:7.5 parts, respectively, at a temperature of about 250° F., for about 45 minutes, to obtain a reaction product; separating the liquid portion of the reaction product; treating said liquid portion of the reaction product with activated clay of the Montmorillonite type at about 180° F.; separating the thus treated liquid portion of the reaction mixture and subjecting it to distillation under reduced pressure, thus obtaining as the residue a polymeric material having a kinematic viscosity at 210° F. of about 836 centistokes, a ring and ball meriting point of about 132° F. and a power factor at 60° C. of 0.07 per cent loss and at 100° C. of 0.40 per cent loss.

CHARLES F. FEASLEY.

References Cited in the file of this patent

UNITED STATES PATENTS

| Number | Name | Date |
|---|---|---|
| 2,200,762 | Anderson et al. | May 14, 1940 |
| 2,200,763 | Anderson et al. | May 14, 1940 |
| 2,216,941 | Gleason | Oct. 8, 1940 |
| 2,397,398 | Badertscher et al. | Mar. 26, 1946 |
| 2,501,600 | Feasley | Mar. 21, 1950 |

OTHER REFERENCES

Schmidt et al.: Principles of High Polymer Theory and Practice, McGraw-Hill, 1948, p. 448.

Walker: Formaldehyde, Reinhold, 1944, page 235.